United States Patent [19]
Moore

[11] Patent Number: 5,806,905
[45] Date of Patent: Sep. 15, 1998

[54] ADJUSTABLE PICKUP TRUCK RACK ASSEMBLY

[76] Inventor: Harmon L. Moore, 3101 Highway 468 West, Pearl, Miss. 39208

[21] Appl. No.: 756,119

[22] Filed: Nov. 25, 1996

[51] Int. Cl.⁶ ..................................................... B60P 3/32
[52] U.S. Cl. .................................................................. 296/3
[58] Field of Search ................................................... 296/3

[56] References Cited

U.S. PATENT DOCUMENTS

| | | | |
|---|---|---|---|
| 2,720,414 | 10/1955 | Hart | 296/12 |
| 2,947,566 | 8/1960 | Tower | 296/10 |
| 3,224,805 | 12/1965 | Clyatt | 296/10 |
| 3,589,576 | 6/1971 | Rinkle et al. | 296/3 |
| 3,594,035 | 7/1971 | Ferguson | 296/3 |
| 3,765,713 | 10/1973 | Suitt | 296/3 |
| 4,057,281 | 11/1977 | Garrett | 296/3 |
| 4,138,046 | 2/1979 | De Freze | 296/3 |
| 4,152,020 | 5/1979 | Brown et al. | 296/3 |
| 4,211,448 | 7/1980 | Weston | 296/3 |
| 4,267,948 | 5/1981 | Lewis | 296/3 |
| 4,398,763 | 8/1983 | Louw | 296/3 |
| 4,405,170 | 9/1983 | Raya | 296/3 |
| 4,509,787 | 4/1985 | Knaack et al. | 296/3 |
| 4,770,458 | 9/1988 | Burke et al. | 296/3 |
| 5,143,415 | 9/1992 | Boudah | 296/3 |
| 5,152,570 | 10/1992 | Hood | 296/3 |
| 5,439,152 | 8/1995 | Campbell | 296/3 |
| 5,494,327 | 2/1996 | Derecktor | 296/3 |

*Primary Examiner*—Gary C. Hoge
*Attorney, Agent, or Firm*—L. Jager Smith, Jr.

[57] ABSTRACT

An adjustable pickup truck rack assembly that is adapted for installation on a wide variety of pickup truck sizes and body styles. The pickup truck rack assembly consists of an upper rack assembly comprising two side frames and fixed or removable cross members, and vertical posts with support arms having a plurality of mounting holes permitting adjustment of the mounting position of the upper rack assembly. The upper rack assembly may be adjusted to either side, or forward or rearward over the cargo bed of the pickup truck.

12 Claims, 9 Drawing Sheets

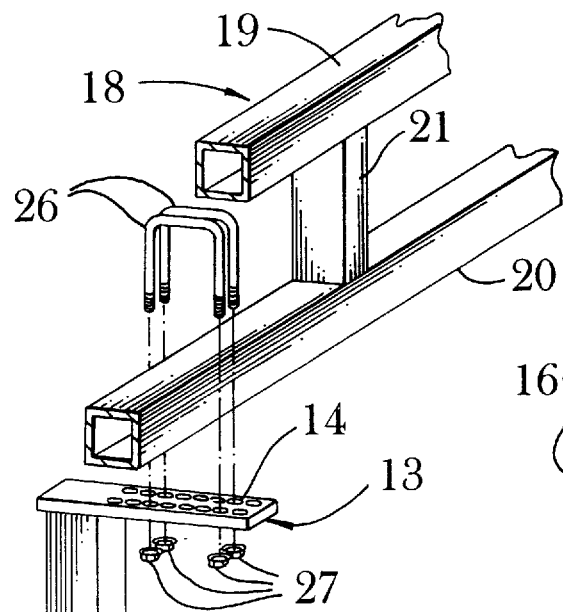
Fig. 2
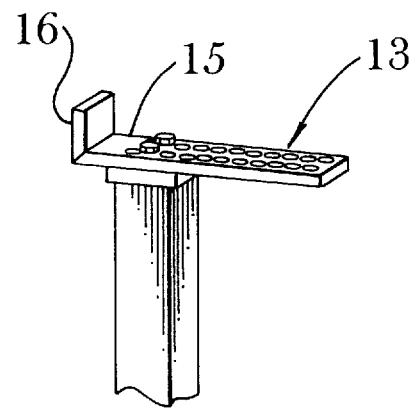
Fig. 3
Fig. 4
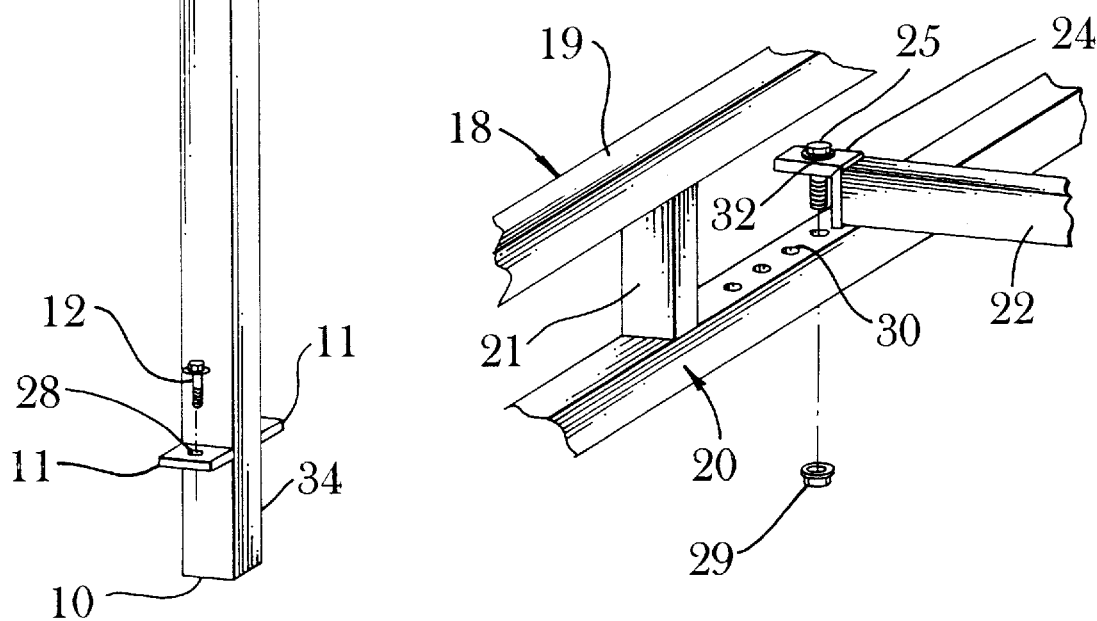

ADJUSTABLE PICKUP TRUCK RACK ASSEMBLY

FIELD OF THE INVENTION

The present invention relates to a novel adjustable rack assembly for use over the bed of a pickup truck, for carrying piping, equipment, or other materials over the bed of the truck. The rack assembly may be adjusted for installation on a wide variety of pickup trucks having different body styles.

BACKGROUND OF THE INVENTION

Many service organizations, farmers, and other pickup truck users employ racks over the beds of their pickup trucks to increase the carrying capacity of their trucks, and to facilitate the transport of materials that are longer than the bed of the truck. Because of the wide range of styles and body sizes on these pickup trucks, however, many users find that they must acquire a custom rack for their truck.

Moreover, when these users decide to acquire a new truck, the rack they may previously have acquired may not be adaptable to their new truck, necessitating the acquisition of a new rack. Because the useful lives of pickup trucks and their racks may not coincide, depending on the service in which they are employed, many users find it necessary to replace one, while still retaining the other for use. Adjustable racks reduce this problem by permitting the user's existing rack to be installed on another truck style.

There is a substantial number of pickup truck rack designs that are known. Many of the rack designs are adjustable to fit on more than one different pickup truck body style. An example of such a rack is presented in U.S. Pat. No. 5,143,415 to Boudah, which discloses a rack employing tubular cross members. The tubular cross members telescope on one another to provide the adjustment feature of the rack.

U.S. Pat. No. 4,211,448, to Weston, also uses a telescoping feature to obtain adjustability. The longitudinal and lateral cross members of Weston telescope inside sleeves to permit the rack to be installed on truck beds of various widths and lengths.

A similar adjustment mechanism is presented in U.S. Pat. No. 4,398,763, to Louw. Louw employs sleeves in longitudinal members of the rack that permit the length of the rack to be varied to fit different truck bodies. The pieces of the longitudinal members telescope into the sleeves to permit the adjustment. Such a telescoping feature is also presented in the vertical members of U.S. Pat. No. 4,138,046, to De Freze.

A principal disadvantage in racks employing telescoping adjustment mechanisms is the loss of strength of the telescoping member, as compared to a single-piece, rigid member. The sleeve, or internal sliding piece of a telescoping member may present a weak link in the assembly that may be subject to failure if the load or moment imposed on the member becomes excessive. Further, the sleeve or internal sliding piece must generally be pinned or secured in place after the desired length is set. The pins or other means used to secure the adjustment, frequently being located around the middle of the adjustable member, may interfere with material that is loaded on the rack.

There is a need for an adjustable rack assembly that avoids the disadvantages discussed above. The present invention provides adjustability of the rack while still retaining the rigidity and overall strength of the support members found in custom-fabricated, unadjustable racks. The invention allows installation on a wide variety of styles and sizes of pickup trucks. The invention employs a number of vertical posts that are installed in the post wells commonly provided in the cargo bed sidewalls of pickup trucks. Each vertical post includes a supporting arm at the top of the vertical post that provides a platform for receiving an upper rack assembly. The supporting arms are pre-drilled with a plurality of mounting holes that receive "U" bolts or other fastening means to secure the upper rack assembly to the vertical posts. As will be demonstrated below, the availability of various mounting holes in the support arms, in combination with the ability to secure the upper rack assembly to the support arms at almost any point along the sides of the upper rack assembly, make the adjustable pickup truck rack adaptable to virtually any pickup truck bed configuration.

SUMMARY OF THE INVENTION

The present invention involves the use of vertical posts with support arms attached to the top thereof, which carry an upper rack assembly over the cargo bed of a pickup truck. The vertical posts may be installed in the post wells found on the top surface of the cargo bed sidewalls of standard pickup trucks. Mounting tabs are provided on the sides of lower ends of the vertical posts, each tab being provided with a hole for a fastener. The user slides the lower ends of the vertical posts down into the post wells on the truck until the mounting tabs come into contact with the top surface of the cargo bed sidewalls. The mounting tabs thereby define an upper and lower section of the vertical posts, the lower section being the part of the vertical post that resides within the post well on the truck when installed, and the upper section being the part that is above the mounting tabs. Screws or other fasteners are installed through the holes in the mounting tabs and into the top surface of the cargo bed sidewalls to secure the vertical posts to the cargo bed sidewalls.

Alternatively to installing the vertical posts in post wells, the vertical posts may be provided with the mounting tabs on the sides of the lower end of the vertical posts. In this configuration, the vertical posts may be fastened directly to the top surface of the cargo bed sidewalls, permitting greater flexibility in mounting locations.

Depending on the load intended to be carried by the user, the length of the cargo bed on the truck, and the number of post wells provided in the cargo bed sidewalls, differing numbers of vertical posts may be employed by the user. Short bed pickup trucks are commonly provided with four post wells, and long bed pickup trucks are commonly provided with six post wells. It would be anticipated, therefore, that four or six vertical posts would be used for most pickup truck applications, however, the adjustment features of the invention do not limit its application to four or six vertical post installations.

Moreover, the vertical posts may be designed such that they are straight, generally perpendicular with the road surface, or angled inward toward the centerline of the truck. Angled vertical posts may be used if a smaller upper rack assembly is desired to be installed, or if a different aesthetic appearance is desired by a user.

Each vertical post is provided with a support arm at the top of the vertical post that extends toward the centerline of the truck out over the cargo bed. The support arms are provided with a plurality of mounting holes to be used to secure the upper rack assembly to the support arms. The support arms preferably are permanently fixed to the vertical post, such as by welding, but they may alternatively be removably fixed to the vertical post, such as with fasteners. In the embodiment wherein the support arms are removably fixed to the top of the vertical posts, the mounting holes described above may be used for mounting the support arm to the top of the vertical posts. In such embodiment, it is possible, by choosing different mounting holes to use to attach the support arms to the vertical posts, to adjust the support arms so that they extend greater or smaller distances out over the cargo bed of the pickup truck.

The support arm may also be provided with an extension away from the centerline of the truck, serving as a ladder support arm, as well as a vertical flange at the end of this ladder support arm, herein designated as the ladder support flange. The ladder support arm will permit the user to carry a ladder or other equipment along the side of the rack assembly, providing easy access to the ladder or equipment by the user without the need to get into the cargo bed. The ladder support flange will restrain a ladder or other equipment installed on the ladder support arm from sliding off the ladder support arm.

The invention includes an upper rack assembly, consisting of two side frames joined together with a plurality of cross members. The side frames consist of a top longitudinal member, and a bottom longitudinal member, between which are located a number of vertical frame members. The preferred embodiment includes welded and ground connections between the vertical frame members and the top and bottom longitudinal members for maximum strength of the side frames. However, fasteners such as bolts or machine screws may be used to make the connections of the various members of the side frames. In such case, the fasteners pass through pre-drilled holes in the top and bottom longitudinal members and into the vertical frame members. Fasteners may be used in the side frame connections if it is desired to make the rack assembly capable of being broken down into smaller elements for purposes of ease in shipping or storing the rack assembly.

The cross members used to connect the two side frames together are spaced along the longitudinal length of the side frames, providing support for loads that may be carried on the rack assembly. The number of cross members may vary from two, to the maximum number of cross members that might physically be installed along the side frames. Four to six cross members should generally be sufficient for carrying most loads. The length of the cross members determine the width of the upper rack assembly. A variety of lengths of cross members may be provided to users in accordance with their needs for wider or narrower upper rack assemblies. All cross members in a given rack assembly as installed will be the same length.

The cross members may be permanently fixed to the side frames, or removable. Permanently fixed cross members offer the advantage of greater rigidity of the entire upper rack assembly, whereas removable cross members offer greater flexibility in disassembling and transporting the rack assembly by virtue the ability to deal with smaller sub-assemblies of the rack assembly. Removable cross members are attached to the bottom longitudinal members using fasteners such as bolts with nuts. The preferred embodiment employs permanently fixed cross members toward the cab end of the truck, and removable cross members over the cargo bed. The use of removable cross members over the cargo bed of the truck permits a user temporarily to remove the removable cross members to facilitate the placement of large loads in the back of the pickup truck with which the cross members might otherwise interfere.

After the user has assembled the upper rack assembly (if the embodiment used involves assembly of the side frames or cross members), the rack is lifted in place with the bottom longitudinal members of the side frames resting on the support arms. The upper rack assembly may be positioned rearward or forward over the truck as desired by the user. The upper rack assembly may be adjusted rearward or forward simply by moving the upper rack assembly to a new position on the support arms. In the preferred embodiment, the upper rack assembly is always permitted to rest on all the support arms that have been installed, although it is anticipated that a user might encounter an application that would involve a different installation. The users' intentions with respect to the loading of the rack assembly may dictate how the user installs the upper rack assembly on the truck.

Depending on the exact location of installation of the cross members on the upper rack assembly, it may be necessary to move the upper rack assembly forward or rearward such that the cross members or vertical frame members of the side frames are not located directly over the support arms, thereby potentially interfering with the mounting of the upper rack assembly on the support arms.

While it is anticipated that most users will center the upper rack assembly between the cargo bed sidewalls, the upper rack assembly may be installed closer to one side or the other of the truck. The positioning of the rack to one side or the other is limited only by the availability of mounting holes on the support arms.

Once the rack is positioned as desired by the user on the support arms, the upper rack assembly may be mounted to the support arms. The preferred embodiment uses "U" bolts, preferably two per support arm, which are placed over the bottom longitudinal member of the side frame and down through the pre-drilled holes in the support arm. Nuts are used to tighten the "U" bolts down over the bottom longitudinal member. Other embodiments may employ holes drilled vertically through the bottom longitudinal member, through which may be passed bolts that would be used to secure the upper rack assembly to the support arms. The "U" bolt installation is preferred, however, because it affords greater variability in mounting location, not being limited to pre-drilled hole locations.

BRIEF DESCRIPTION OF THE DRAWING

The organization and manner of the structure and operation of the invention, together with further advantages thereof, may be best understood by reference to the following description, taken in connection with the accompanying drawings, wherein like reference numerals identify like elements, in which:

FIG. 2 is a view of an embodiment of a vertical post with its corresponding support arm, and showing a mode of installation of an upper rack assembly on the support arm;

FIG. 3 is a view of another embodiment of a vertical post designed to allow for the user to carry a ladder or other equipment on the side of the rack assembly;

FIG. 4 is an illustration of a section of a bottom longitudinal member of a side frame showing the mounting detail of a removable cross member;

DETAILED DESCRIPTION OF SPECIFIC EMBODIMENTS OF THE INVENTION

Figure 1:
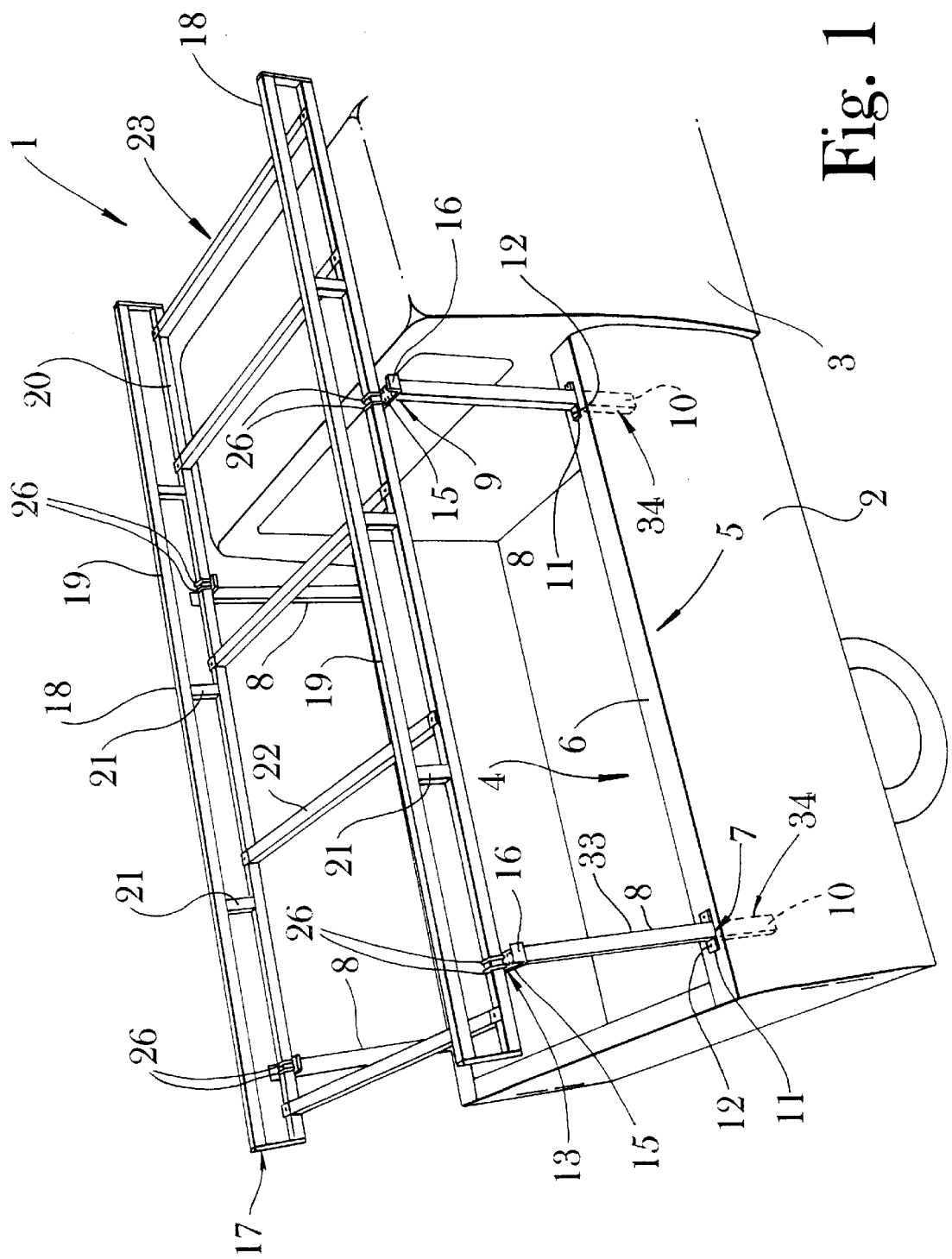
FIG. 1 is a perspective view of a rack in accordance with the present invention installed on a pickup.

Referring to FIG. 1, a perspective drawing of an adjustable pickup truck rack assembly 1 in accordance with the present invention is shown mounted on a pickup truck 2, having a cargo bed 4. The embodiment illustrated uses four vertical posts 8 whose lower ends 10 are inserted into the post wells 7 located in the cargo bed sidewalls 5. The lower sections 34 of the vertical posts 8 are fully inserted into post wells 7 when the posts are installed, and the upper sections 33 of the vertical posts extend above the top surface 6 of the cargo bed sidewalls 5. Mounting tabs 11 are provided on the vertical posts 8 at the juncture of the upper section 33 and the lower section 34 of the vertical posts 8 to permit the vertical posts 8 to be secured to the top surface 6 of the cargo bed sidewalls 5. The mounting tabs 11 are secured to the top surface 6 by means of screws 12.

The upper rack assembly 17 consists of two side frames 18 connected by, in the embodiment illustrated, a plurality of removable cross members 22 and fixed cross members 23. Any number of the cross members may be removable or fixed. The side frame 18 consists of a top longitudinal member 19 above a bottom longitudinal member 20, connected by a plurality of vertical frame members 21.

In FIG. 1, the upper rack assembly 17 is shown mounted on the support arms 13 at the upper end 9 of each vertical post 8. "U" bolts 26 are used in the embodiment shown to secure the upper rack assembly 17 to the support arms 13. The illustrated rack assembly extends over the cab 3 of truck 2.

Turning now to FIG. 2, a detail of an embodiment of a vertical post 8 is shown, along with a portion of an upper rack assembly 17. Mounting tabs 11, being pre-drilled with holes 28, can be seen near the lower end 10 of vertical post 8. Screws 12 are used to secure vertical post 8 to the top surface 6 of cargo bed sidewalls 5. At the top end 9 of vertical post 8 is support arm 13. Pre-drilled holes 14 are provided in support arm 13 to permit adjustment of lateral position of the upper rack assembly 17 and to accommodate a variety of cargo bed widths found in pickup trucks of various models. In the embodiment illustrated, upper rack assembly 17 is mounted on the support arm 13 by means of "U" bolts 26, which are installed over the bottom longitudinal member 20 of the side frames 18. The "U" bolts 26 pass through the pre-drilled holes 14 in support arm 13, and are secured underneath with nuts 27.

FIG. 3 illustrates another embodiment of the invention involving a feature to carry a ladder or other equipment alongside the rack. As can be seen in FIG. 3, a ladder support arm 15 is provided extending opposite the support arm 13. Ladder support arm 15 is provided with a ladder support flange 16 extending upward from ladder support arm 15 to hold the ladder on the ladder support arm 15.

Figure 8:
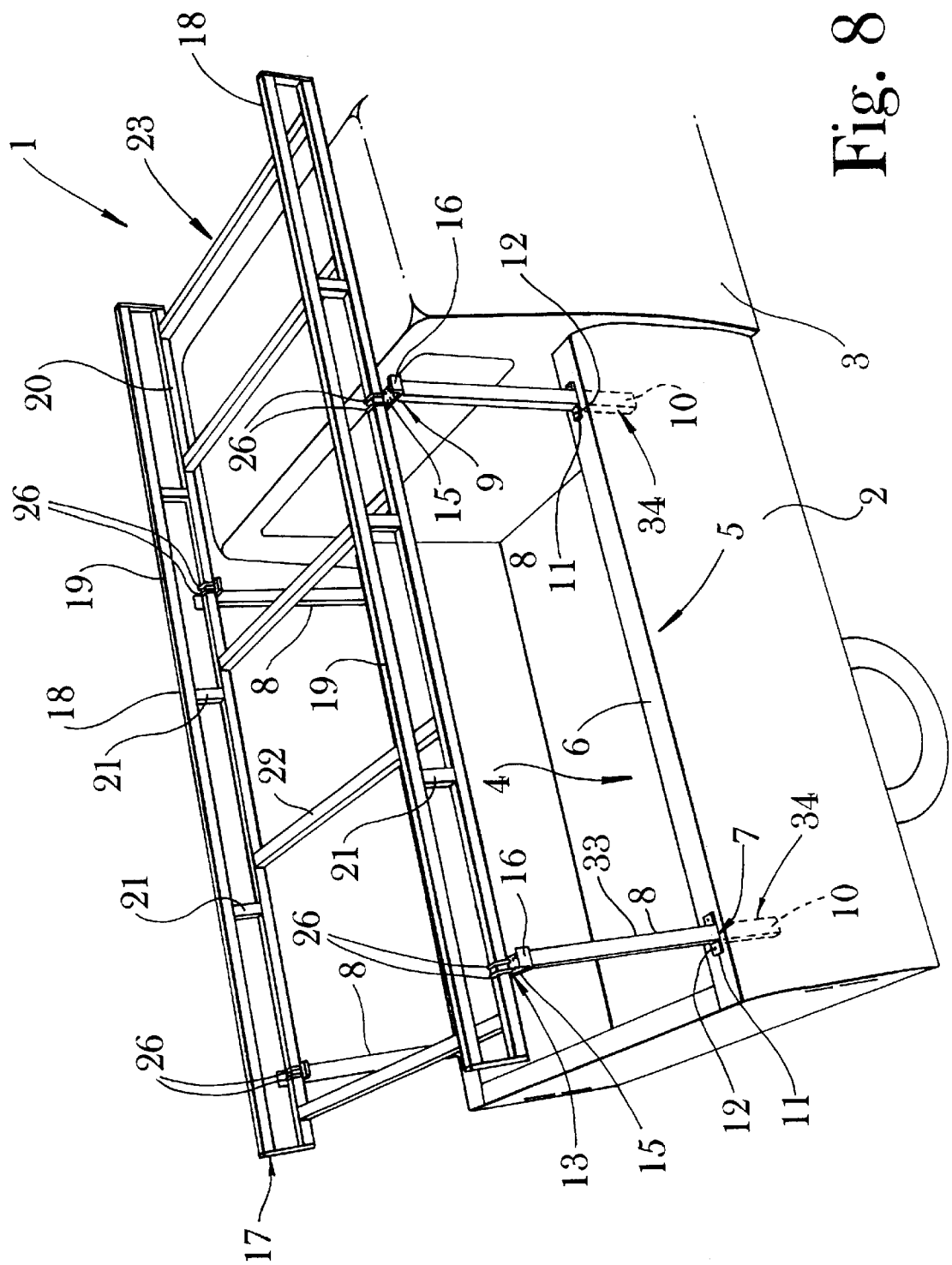
FIG. 8 is a perspective view of an embodiment of the invention wherein the cross members of the upper rack assembly are permanently fixed to the bottom longitudinal members of the side frames.
Figure 9:
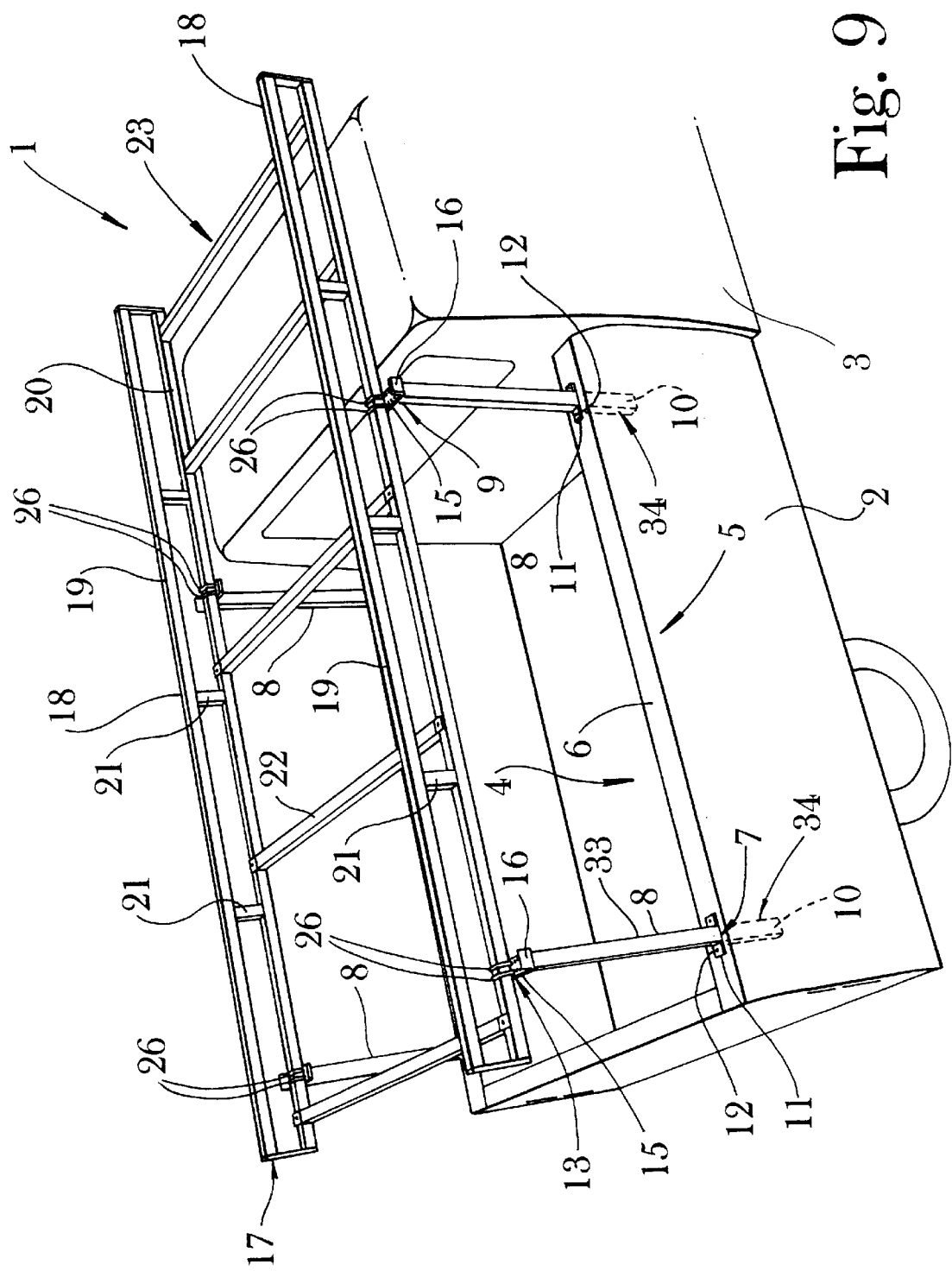
FIG. 9 is a perspective view of an embodiment of the invention wherein some of the cross members of the upper rack assembly are permanently fixed to the bottom longitudinal members of the side frames, and some of the cross members of the upper rack assembly are removably connected to the bottom longitudinal members with fasteners.

FIG. 4 shows a means of mounting removable cross members 22 to the bottom longitudinal member 20 of side frame 18. Removable cross member 22 is provided with a mounting flange 24 that rests when installed on the top of the bottom longitudinal member 20. Bottom longitudinal member 20 may be provided with a plurality of mounting holes 30 that permit adjustment of the placement of removable cross member 22 along bottom longitudinal member 20. Bolt 25 passes through pre-drilled hole 32 in mounting flange 24, and through one of the mounting holes 30, and is secured below bottom longitudinal member 20 by nut 29. FIG. 8 shows an embodiment of the invention wherein all of the cross members 22 are permanently fixed to the bottom longitudinal members 20 of the side frame 18, and FIG. 9 shows an embodiment of the invention wherein some of the cross members 22 are permanently fixed, and some are removably connected to the bottom longitudinal members 20 with fasteners.

Figure 5:
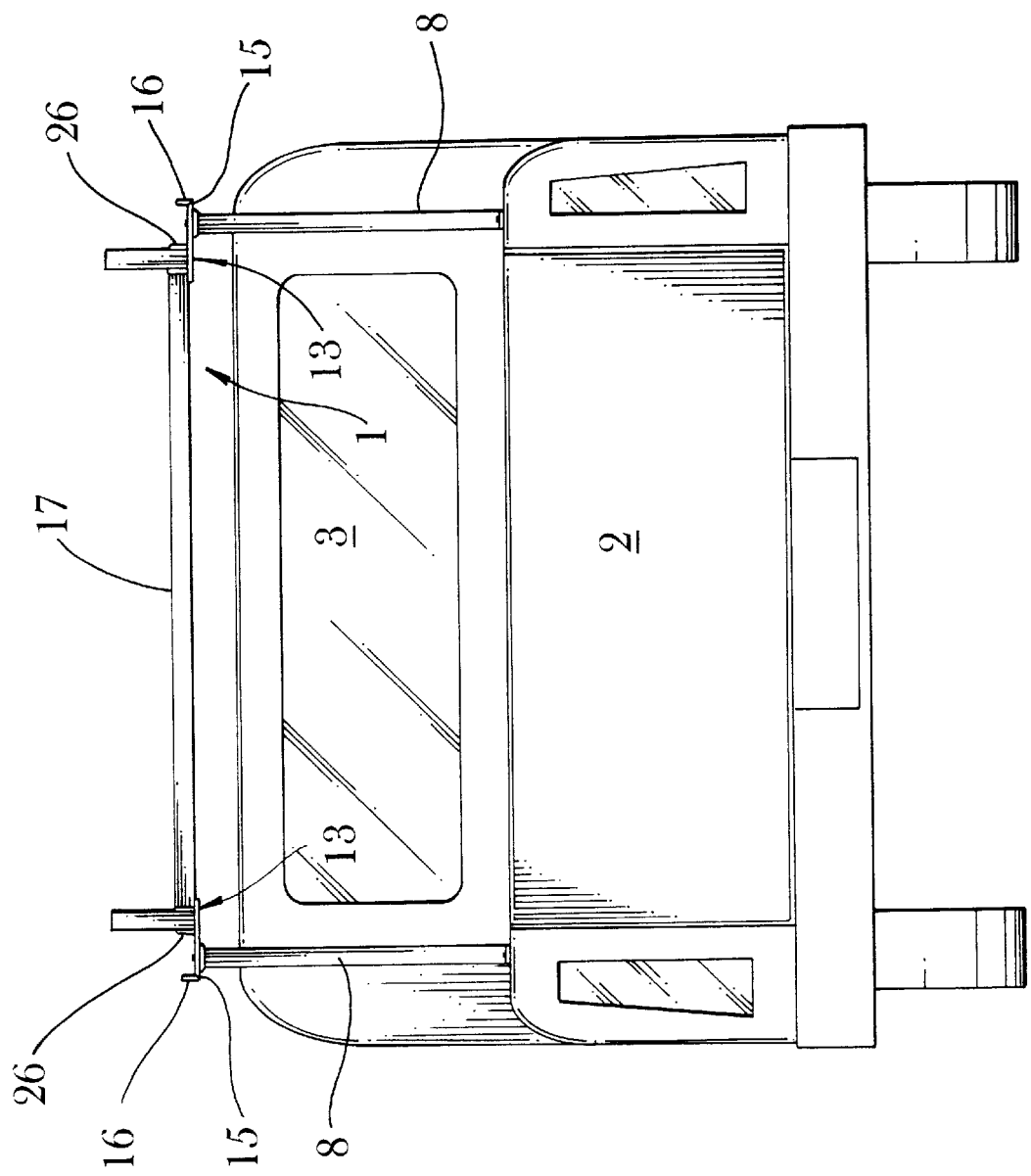
FIG. 5 is an elevation of the rack assembly viewed from the rear of a truck, showing the upper rack assembly mounted on the support arms.

Turning now to FIG. 5, an elevation of the rack assembly 1 viewed from the rear of truck 2 is shown. FIG. 5 illustrates the final installed configuration of an embodiment of rack assembly 1, showing the upper rack assembly 17 resting on support arms 13, and secured to the support arms with "U" bolts 26. Ladder support arm 15 and ladder support flange 16 are also illustrated in this figure.

Figure 6:
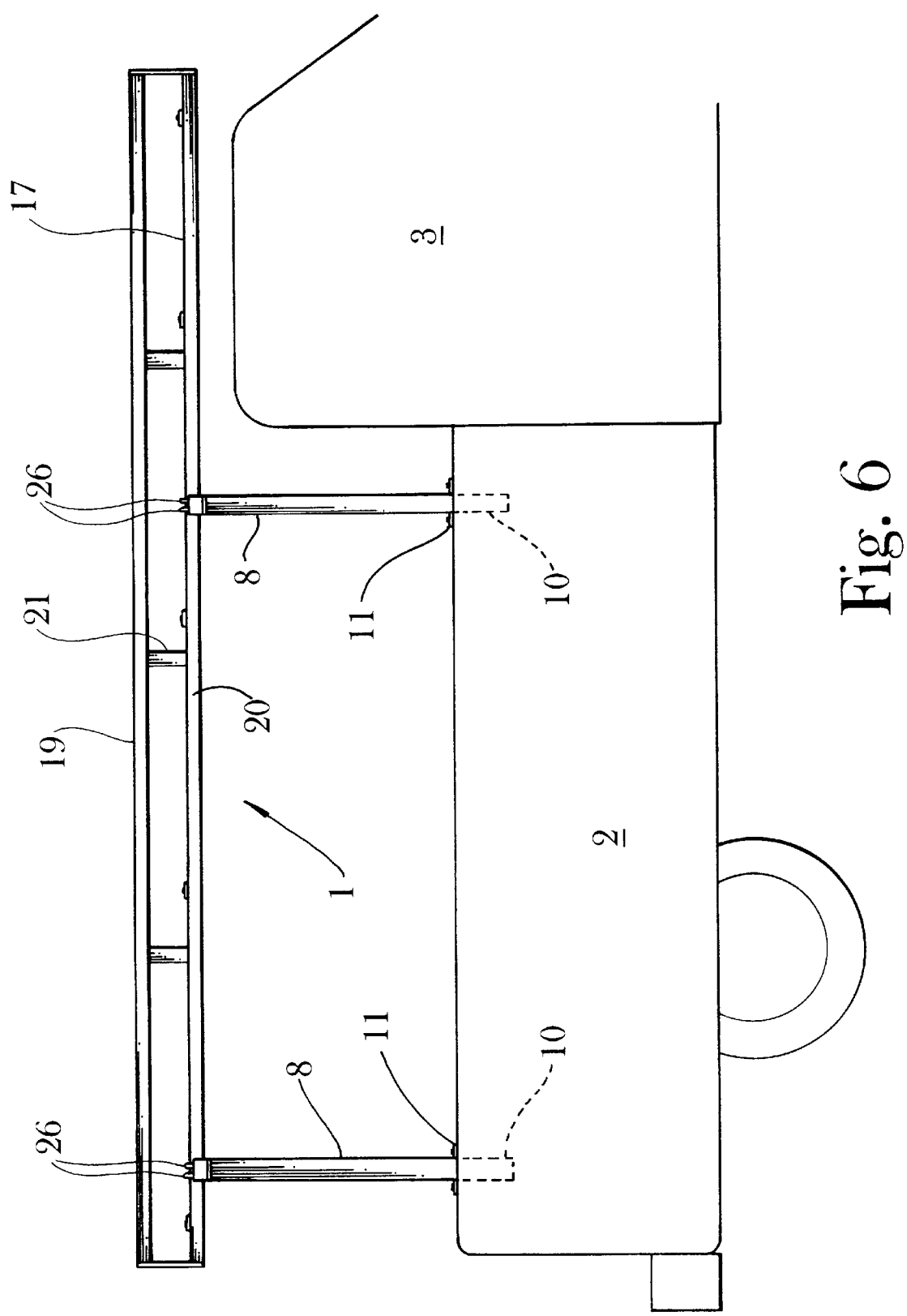
FIG. 6 is an elevation of the rack assembly viewed from the side of a truck.

FIG. 6 is an elevation of rack assembly 1 viewed from the side of truck 2. This illustration of an installed rack assembly 1 shows the upper rack assembly 17 extending over the cab 3 of truck 2.

Figure 7:
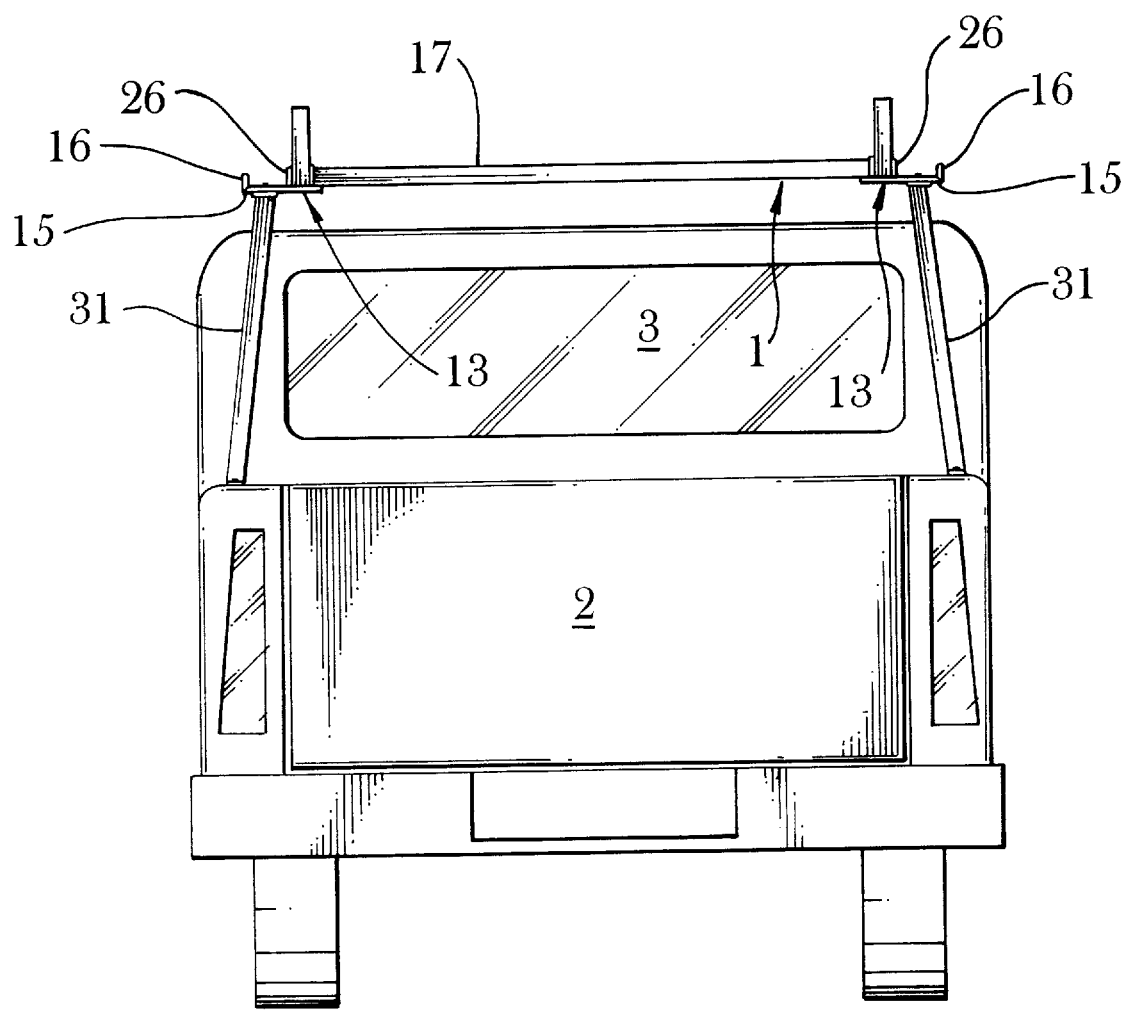
FIG. 7 is an elevation of an embodiment of the rack assembly employing angled vertical posts.

FIG. 7 is an elevation of still another embodiment of the invention viewed from the rear of truck 2. This embodiment employs angled vertical posts 31. The use of angled vertical posts 31 alters the aesthetic effect of the rack assembly 1.

Figure 10:
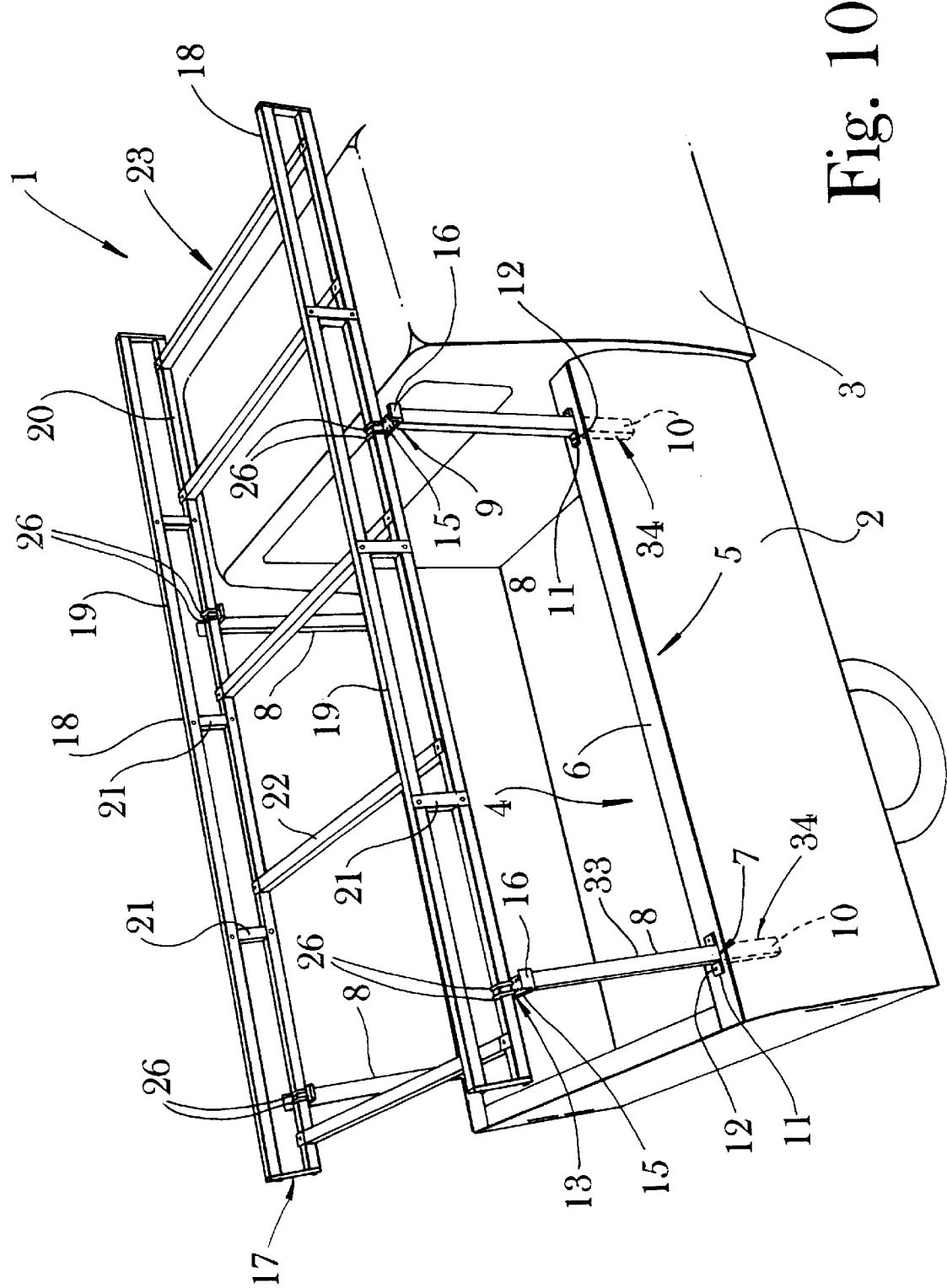
FIG. 10 is a perspective view of an embodiment of the invention wherein the top longitudinal members, bottom longitudinal members and vertical frame members of the side frames are connected together with fasteners.

FIG. 10 shows an embodiment of the rack assembly 1 wherein fasteners are used to make the connections of the various members of the side frames 18.

Figure 11:
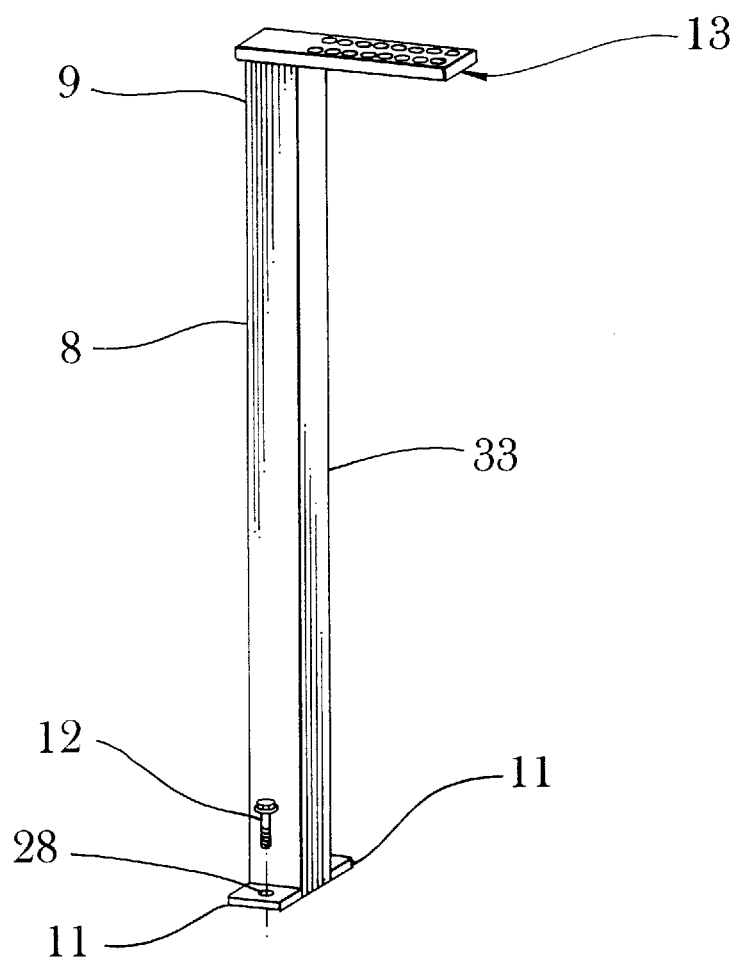
FIG. 11 is a perspective view of an embodiment of the vertical posts wherein the vertical posts are provided with mounting tabs at the lower end of the vertical posts, each mounting tab having a pre-drilled hole therein.

FIG. 11 shows an embodiment of the vertical posts 8 wherein the vertical posts 8 are provided with mounting tabs 11 on the sides of the lower end 10 of each vertical post 8. In this embodiment, the vertical posts 8 are fastened directly to the top surface 6 of cargo bed sidewalls 5.

From the foregoing detailed description of specific embodiments of the invention, it should be apparent that a useful and versatile adjustable pickup truck rack assembly has been disclosed. While specific embodiments of the invention have been described in detail, it is to be understood that various alterations, substitutions and modifications can be made therein without departing from the spirit and scope of the present invention as defined in the appended claims.

I claim:

1. An adjustable pickup truck rack assembly, comprising:
    (a) a plurality of vertical posts, each having a top end and a bottom end, and an upper section and a lower section;
    (b) support arms mounted at the top end of each vertical post, and having therein a plurality of pre-drilled holes;
    (c) an upper rack assembly resting on and attached to the support arms, the upper rack assembly consisting of two side frames, each side frame composed of a top longitudinal member and a bottom longitudinal member connected with a plurality of vertical frame members, and the two side frames being connected together with a plurality of cross members secured to the bottom longitudinal member of each side frame, wherein some of the cross members are permanently fixed to the bottom longitudinal members of the side frames, and some of the cross members are removably connected to the bottom longitudinal members with fasteners, the upper rack assembly being connected to the support arms with "U" bolts which pass over the bottom longitudinal member of the side frames and through the pre-drilled holes in the support arm.

2. The adjustable pickup truck rack assembly according to claim 1, wherein the vertical posts are provided with mounting tabs at the juncture of the upper section and the lower section of the vertical posts, each mounting tab having a pre-drilled hole therein.

3. The adjustable pickup truck rack assembly according to claim 1, wherein the cross members of the upper rack assembly are permanently fixed to the bottom longitudinal members of the side frames.

4. The adjustable pickup truck rack assembly according to claim 1, wherein the cross members of the upper rack assembly are removably connected to the bottom longitudinal members with fasteners.

5. The adjustable pickup truck rack assembly according to claim 1, wherein a ladder support arm is attached at the top end of the vertical posts, extending opposite the support arms, and a vertical ladder support flange is attached to the ladder support arm.

6. The adjustable pickup truck rack assembly according to claim 1, wherein the vertical posts are straight.

7. The adjustable pickup truck rack assembly according to claim 1, wherein the upper section of the vertical posts forms an angle with respect to the lower section of the vertical posts.

8. The adjustable pickup truck rack assembly according to claim 1, wherein the support arms are permanently attached to the top end of the vertical posts.

9. The adjustable pickup truck rack assembly according to claim 1, wherein the support arms are removably attached to the top end of the vertical posts with fasteners.

10. The adjustable pickup truck rack assembly according to claim 1, wherein the top longitudinal members, bottom longitudinal members and vertical frame members of the side frames are permanently attached together.

11. The adjustable pickup truck rack assembly according to claim 1, wherein the top longitudinal members, bottom longitudinal members and vertical frame members of the side frames are connected together with fasteners.

12. The adjustable pickup truck rack assembly according to claim 1, wherein the vertical posts are provided with mounting tabs at the lower end of the vertical posts, each mounting tab having a pre-drilled hole therein.

* * * * *